July 24, 1928.
C. D. KRETZER
1,678,343
PLOW
Filed June 6, 1927　　　2 Sheets-Sheet 1
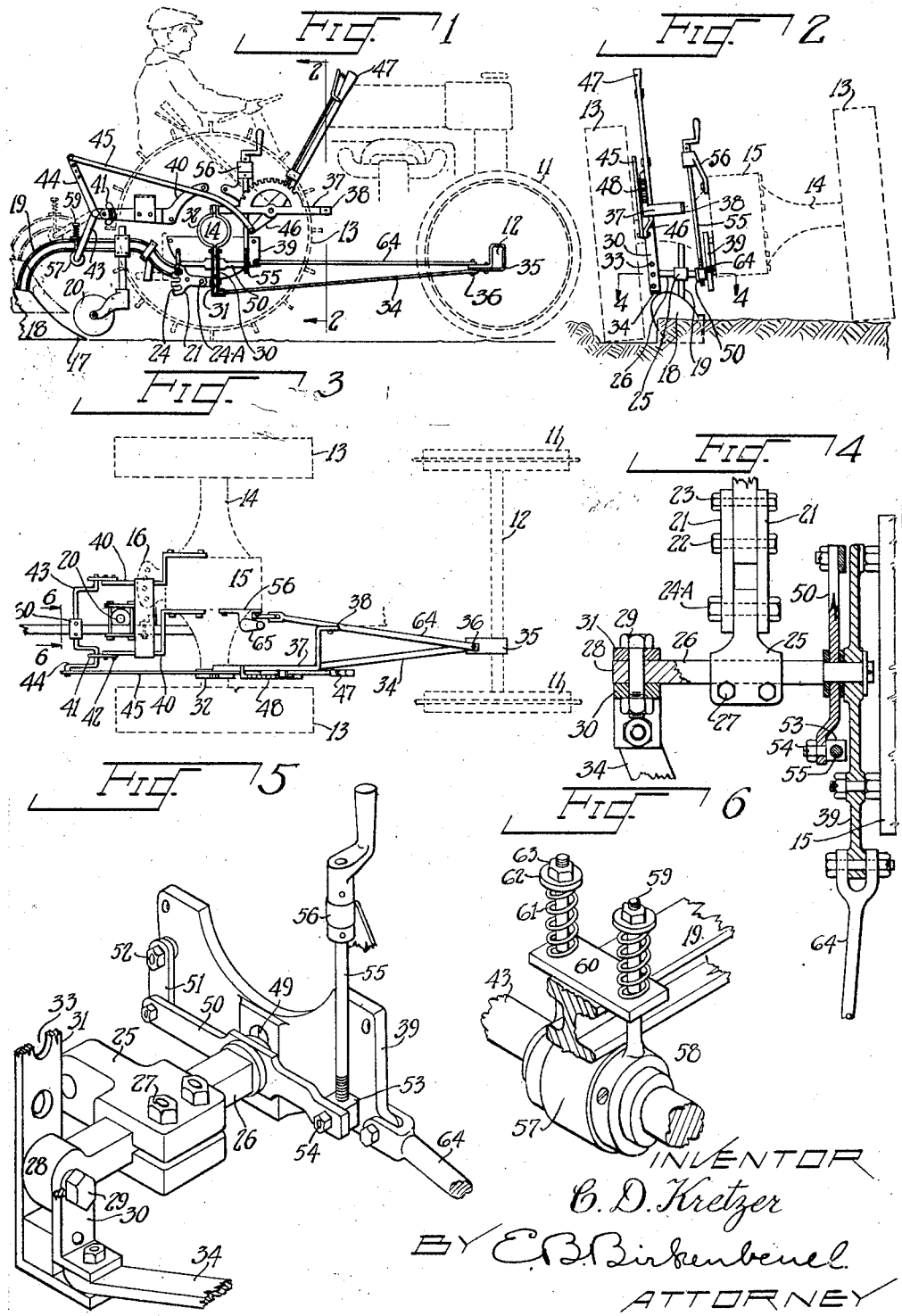

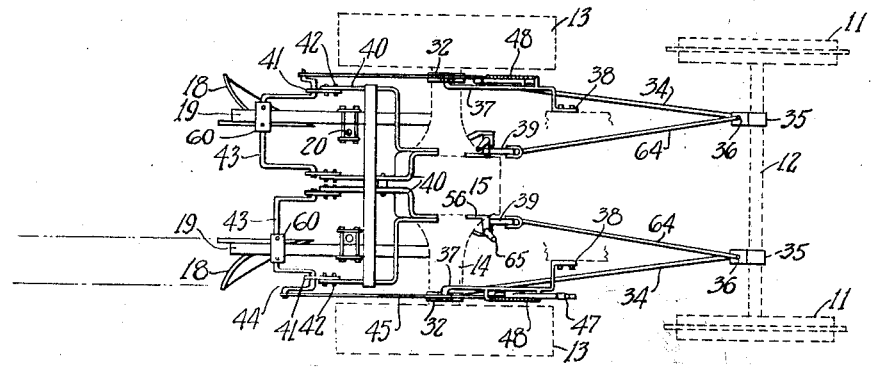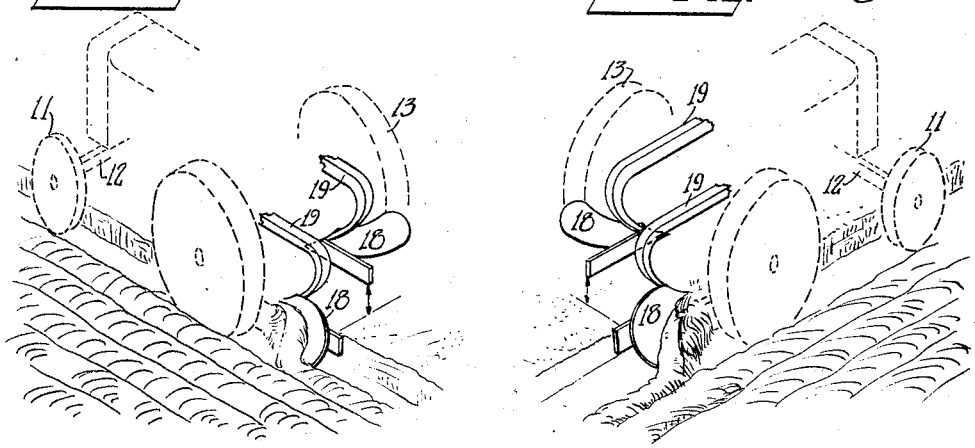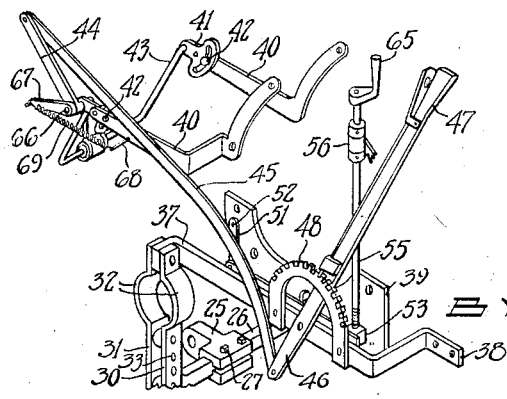

Patented July 24, 1928.

1,678,343

UNITED STATES PATENT OFFICE.

CHARLES D. KRETZER, OF PORTLAND, OREGON.

PLOW.

Application filed June 6, 1927. Serial No. 196,737.

This invention relates generally to agriculture, and particularly to a special form of plow adapted to be drawn by a tractor.

The main object of this invention is to provide a new form of hitch whereby a plow can be attached to the rear of a tractor and in such close proximity thereto as to greatly facilitate the maneuvering of the tractor and the plow and to improve the quality of the plowing done.

The second object is to so attach the plow to the tractor that the depth of the plowing will be exceedingly uniform to the entire exclusion of all "skips," and if, for any reason, the plow should run out of the ground, due to the encounter of a stone or other obstruction, it will immediately run back into the ground to the desired depth.

The third object is to so attach the plow to the tractor as to reduce its tendency to "buck"—that is, for its front wheels to rise from the ground whenever the load becomes unusually heavy.

The fourth object is to make the plow easily controllable from the driver's seat and adjustable both for angularity and depth of plowing with very little effort on the part of the driver.

The fifth object is to provide a special spring-urged mechanism for urging the plow to the full depth of plowing at all times.

The sixth object is to so construct the plow that it can be easily converted from a right to a left hand plow for side hill plowing purposes.

The seventh object is to so construct the attachments as to require the minimum amount of alteration in the tractor itself, with special reference to that type of tractor known in the market as a Fordson.

These, and other objects, will become more apparent from the specification following as illustrated in the accompanying drawings, in which:

Figure 1 is a side elevation of the device showing its relation to a tractor. Figure 2 is a vertical section taken along the line 2—2 in Figure 1. Figure 3 is a plan of Figure 1. Figure 4 is a horizontal section taken along the line 4—4 in Figure 2. Figure 5 is a perspective view of the plow point adjusting mechanism. Figure 6 is a perspective view of the plow beam support and the spring mounting therefor. Figure 7 is a plan of a modified form of the device showing right and left hand plows similarly mounted behind a tractor. Figure 8 is a phantom view of the tractor showing the left hand plow in operation on a hill side. Figure 9 is similar to Figure 8 but showing the right hand plow in operation. Figure 10 is a perspective view of the plow operating mechanism and various associated adjustments.

Similar numbers of reference refer to similar parts throughout the several views.

Referring in detail to the drawings, there is shown, in phantom, a tractor provided with the usual front wheels 11 and front axle 12 and the rear wheels 13 and rear axle 14 which project from the differential casing 15. The hitch 16 which forms a part of the tractor is indicated, but is not employed with this device.

It will be noted that the point 17 of the plow 18 is very close to the wheels 13 and that the beam 19 is bent to permit the hinged point of the plow to be in the correct position. The usual colter 20 is attached to the beam 19.

The forward end of the plow beam 19 has bolted thereto the side members 21 by means of the bolts 22 and 23. The members 21 are provided with slots 24 which permit a considerable adjustment for the plow point; the real hinging point of the plow being on the bolt 24-A which passes loosely through the arm 25 which is mounted on the transverse bar 26. The member 26 is preferably square and the arm 25 is clamped thereto by means of the bolts 27. The outer end 28 of the bar 26 is hinged on the bolt 29, which passes through the uprights 30 and 31 whose curved portions 32 pass around the axle 14. The members 30 and 31 are provided with holes 33 for the bolt 29 which provides a coarse adjustment for the plow point.

To the lower end of the members 30 and 31 is secured a forwardly extending strap 34 whose forward end is secured to the clamp 35 on the front axle 12 by means of the bolt 36.

At the upper end of the members 30 and 31 is secured one end of a bar 37 whose forward end 38 is secured to the tractor itself. Behind the bar 37 is a plate 39 which is bolted to the side of the differential casing 15. To the differential casing 15 is also secured a pair of rearwardly extending brackets 40 whose rearmost ends carry the hinged plates 41 which are adjustably attached to the members 40 by the bolts 42.

Between the plates 41 is mounted a crank 43 whose operating arm 44 is connected by means of a bent connecting rod 45 to the lower end 46 of a hand lever 47 whose quadrant 48 is mounted on the bar 37.

In the plate 39 is formed a vertical slot 49 which acts as a guide for the end of the bar 26. The bar 26 is supported on the floating lever 50 whose rearward end is supported on the link 51 which is attached to the plate 39 by means of the bolt 52. The forward end of the lever 50 is provided with a nut 53 to which it is attached by means of the trunnion bolt 54. Passing through the nut 53 is an upright rod 55 whose threaded end extends into the nut 53 and whose upper end journals in the bracket 56 which is mounted on the side of the differential casing 15.

On the crank 43 is mounted a roller 57 upon which rests the plow beam 19. On each side of the roller 57 is secured a collar 58 from which projects the upright standard 59 across which is placed the bar 60 which rests on top of the plow beam 19. Springs 61 on the members 59 are held down by the washers 62 and the nuts 63.

Attached to the lower forward corner of the plate 39 is a tie rod 64 whose forward end is also secured by the bolt 36.

The operation of the device is as follows: When starting to plow the bolt 29 is first passed through the desired hole 33 and the crank 65 on the rod 55 is rotated to raise its end of the bar 26 the desired height. It is assumed that the bolt 23 has been placed in the correct slot 24 so as to require the least adjustment possible.

The driver then moves the hand lever 47 forward which allows the plow to descend and to permit it to run into the ground as soon as the tractor moves forward. Any tendency to jump out of the ground is overcome by the tension of the springs 61, which maintain a spring pressure against the top of the beam 19.

The parts of the right and left hand plows have not been separately described since they are identical in nature, with the exception that one is right hand and the other left hand.

In raising the plow out of the ground the operator merely draws the lever 47 toward him, a movement which permits him to use his greatest strength, although the operation itself is not at all arduous.

It can be seen from the above construction that this hitch enables the plow to operate closely to the tractor without the use of a sulky device which will ordinarily cause it to trail at some distance behind the tractor, which is usually the case, requiring much room for turns, causing a considerable loss of time and undue packing of the soil, due to the distance the tractor must travel to properly plow a given acreage.

Mounted on the pin 66, which also forms a pivot for the arm 44, and in rigid relation to the arm 44, is a lever 67 between whose end and the pin 68 in the bracket 40 is mounted a spring 69 which assists in holding the plow beam 19 upwardly when in its upper position and downwardly when in its lower position.

I am aware that many different types of hitches have been constructed for use between tractors and plows; I therefore do not intend to cover such devices broadly, but I do intend to cover all such forms and modifications thereof as fall fairly within the appended claims.

I claim:

1. A plow having a hitch for attaching same to the front axle of a tractor, an adjustable hitch support for the forward end of the plow beam, a lever for raising said plow out of the ground, a crank actuated by said lever, a roller on said crank engaging the under side of the plow beam, and spring means on said crank adapted to urge said plow downwardly.

2. A plow hitch for tractor plows consisting of a bar, a hitch clamp on said bar, a bracket hung from the rear axle of the tractor supporting the outer end of said bar, a plate attached to the tractor frame supporting the inner end of said bar, tie rods between said bar and the front axle of the tractor, means for adjusting the height of the bar, and lever means for raising a plow whose beam is attached to said hitch clamp.

3. A depressor for plow beams consisting of a crank, a roller mounted on said crank adapted to engage the under side of a plow beam, spring means for urging a plow beam toward said roller, and lever means for rocking said crank.

CHARLES D. KRETZER.